United States Patent
Jonsson et al.

(10) Patent No.: US 8,300,877 B2
(45) Date of Patent: Oct. 30, 2012

(54) COPY PROTECTED INFORMATION DISTRIBUTION

(75) Inventors: Leif Paul Mikael Jonsson, Malmo (SE); Martin Kenneth Sjolin, Lund (SE)

(73) Assignee: Sony Mobile Communications AB, Lund (SE)

( * ) Notice: Subject to any disclaimer, the term of this patent is extended or adjusted under 35 U.S.C. 154(b) by 1077 days.

(21) Appl. No.: 11/676,691

(22) Filed: Feb. 20, 2007

(65) Prior Publication Data

US 2008/0199040 A1 Aug. 21, 2008

(51) Int. Cl.
*G06K 9/00* (2006.01)
*H04N 1/40* (2006.01)

(52) U.S. Cl. ........................ 382/100; 358/3.28

(58) Field of Classification Search ................... 382/100
See application file for complete search history.

(56) References Cited

U.S. PATENT DOCUMENTS

| | | | |
|---|---|---|---|
| 6,664,976 B2 * | 12/2003 | Lofgren et al. ............... | 345/634 |
| 6,700,989 B1 * | 3/2004 | Itoh et al. ...................... | 382/100 |
| 7,046,808 B1 * | 5/2006 | Metois et al. ................. | 380/252 |
| 2003/0065747 A1 * | 4/2003 | Sakamoto et al. ............ | 709/219 |
| 2003/0081779 A1 | 5/2003 | Ogino | |
| 2003/0083098 A1 * | 5/2003 | Yamazaki et al. ............ | 455/556 |
| 2003/0191941 A1 * | 10/2003 | Terada et al. ................. | 713/176 |
| 2004/0005078 A1 * | 1/2004 | Tillotson ....................... | 382/100 |
| 2004/0008923 A1 * | 1/2004 | Anzai et al. ...................... | 385/16 |
| 2004/0223615 A1 * | 11/2004 | Dhawan ........................ | 380/261 |
| 2005/0144458 A1 * | 6/2005 | Venkatesan et al. .......... | 713/176 |
| 2005/0154925 A1 * | 7/2005 | Chitrapu et al. .............. | 713/202 |
| 2006/0005029 A1 * | 1/2006 | Petrovic et al. ............... | 713/176 |
| 2006/0078159 A1 * | 4/2006 | Hamatake et al. ............ | 382/100 |
| 2006/0156385 A1 * | 7/2006 | Chiviendacz et al. ............ | 726/2 |
| 2007/0016614 A1 * | 1/2007 | Novy .......................... | 707/104.1 |
| 2007/0050696 A1 * | 3/2007 | Piersol et al. ................. | 715/500 |
| 2007/0053549 A1 * | 3/2007 | Miller et al. .................. | 382/100 |
| 2007/0174623 A1 * | 7/2007 | Watson ......................... | 713/176 |
| 2007/0177761 A1 * | 8/2007 | Levy ............................. | 382/100 |
| 2008/0028222 A1 * | 1/2008 | Moskowitz ................... | 713/176 |
| 2008/0059236 A1 * | 3/2008 | Cartier ............................. | 705/3 |
| 2008/0059992 A1 * | 3/2008 | Amidon et al. ................. | 725/25 |
| 2008/0062315 A1 * | 3/2008 | Oostveen et al. ............. | 348/500 |
| 2008/0220776 A1 * | 9/2008 | Tischer et al. ............. | 455/435.1 |
| 2008/0273861 A1 * | 11/2008 | Yang et al. ...................... | 386/95 |
| 2009/0089427 A1 * | 4/2009 | Moskowitz et al. .......... | 709/225 |
| 2009/0222848 A1 * | 9/2009 | Ramaswamy .................... | 725/9 |

FOREIGN PATENT DOCUMENTS

| | | |
|---|---|---|
| EP | 0 947 953 A2 | 10/1999 |
| JP | 2003-078751 A | 3/2003 |
| JP | 2004-072316 A | 3/2004 |

OTHER PUBLICATIONS

International Search Report with Written Opinion in PCT Application No. PCT/IB2007/053297, dated Mar. 6, 2008, 10 pages.
State Intellectual Property Office, P.R. China; Second Office Action; Apr. 6, 2011; issued in Chinese Patent Application No. 2007800513138.
State Intellectual Property Office, P.R. China; Third Office Action; Oct. 19, 2011; issued in Chinese Patent Application No. 200780051313.8.
Japanese Patent Office; Final Office Action; Jun. 20, 2011; issued in Japanese Patent Application No. 2009-549855.

* cited by examiner

*Primary Examiner* — Chan S Park
*Assistant Examiner* — Avinash J Yentrapati
(74) *Attorney, Agent, or Firm* — Sreenivas Vedantam; Moore & Van Allen PLLC (57) ABSTRACT

A device may capture an image in a portable device, embed a watermark into the image in the portable device, and transmit the watermarked image through a wireless interface of the portable device.

20 Claims, 12 Drawing Sheets

© 2007 Mikael Jönsson
and Martin Sjölin

COPY PROTECTED INFORMATION DISTRIBUTION

TECHNICAL FIELD OF THE INVENTION

Implementations described herein are related to copy protecting digital data and in particular, pertain to methods and devices for processing digital data to protect its ownership and/or to preserve its authenticity.

DESCRIPTION OF RELATED ART

Today's mobile devices have the ability to distribute images or sounds that are captured as photographs, videos, or audio files. When photographs, video clips, or audio files that are captured on a mobile device are distributed to others through various communication media, such as an email service, a Multimedia Messaging Service, or a web posting (e.g., blog) service, the author may expose her original work to potential piracy. Furthermore, because digital data can be modified, the distributed work may not be relied upon as being authentic.

SUMMARY

According to one aspect, a method may comprise capturing an image in a portable device, embedding a watermark into the image in the portable device, and transmitting the watermarked image through a wireless interface of the portable device.

Additionally, capturing an image in a portable device may include capturing an image in a portable device by using a camera in the portable device.

Additionally, embedding a watermark into the image may include embedding a visible watermark.

Additionally, embedding a watermark into the image may include embedding an invisible watermark.

Additionally, embedding a watermark into the image may include embedding copy protection information as a Discrete Cosine Transform (DCT) watermark.

Additionally, the method may further comprise downloading an image to the portable device, extracting a watermark from the downloaded image, and determining if the extracted watermark is a watermark that has been embedded in the image by the portable device.

Additionally, the method may further comprise accepting an input that indicates a desired level of copy protection.

Additionally, embedding a watermark may include selecting a watermark based on the input that indicates a desired level of copy protection, and automatically embedding the selected watermark into the image in the portable device.

According to another aspect, a method may comprise creating an image in a portable device by using a camera included the portable device, degrading the image in the portable device, and distributing the degraded image through a wireless interface of the portable device.

According to yet another aspect, a device may comprise a camera and a wireless interface. The device may further comprise a processor to capture an image in the device by using the camera, automatically insert a watermark into the image, and transmit the image with the watermark through the wireless interface to another device.

Additionally, the device may further comprise a portable phone.

Additionally, the watermark may include a copyright watermark.

Additionally, the watermark may include information that identifies the device.

Additionally, the watermark may include a watermark that encodes a message based on a secret key.

Additionally, the watermark may include a watermark that authenticates the image.

Additionally, the watermark may include a watermark that, when inserted into an image, may be recovered from the image after the image is modified.

Additionally, the watermark may include biometric information that identifies an author of the image.

Additionally, the device may further comprise a biometric sensor for providing the biometric information to be included in the watermark.

According to yet another aspect, a portable device may comprise a camera and a wireless interface. Additionally, the portable device may further comprise a processor to generate an image in the portable device by using the camera, automatically reduce a quality of the image, and send an image with the reduced quality to another device by using the wireless interface.

According to a further aspect, a wireless device may comprise means for capturing an image in the wireless device, means for incorporating a watermark into the image, and means for transferring the image with the watermark to another wireless device.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements. The term "camera," as used herein, may include a device that may capture and store images and/or video. For example, a digital camera may include an electronic device that may capture and store images and/or video electronically instead of using photographic film. A digital camera may be multifunctional, with some devices capable of recording sound and/or video, as well as images.

The term "watermark," as used herein, may refer to a distinguishing piece of information that is adhered to or incorporated into data that the distinguishing piece of information is intended to protect or to authenticate. A digital watermark, when it is inserted into data, may be visible/audible or invisible/inaudible and may be difficult to remove by those other than one who inserted the watermark.

In the following implementations, a device may capture images as pictures or photographs. Before the images are distributed, the images may be preprocessed. The preprocessing may embed a watermark to provide convenient copyright protection and preservation of image authenticity for users who wish to easily and quickly share the captured images.

Exemplary Device

Figure 1:
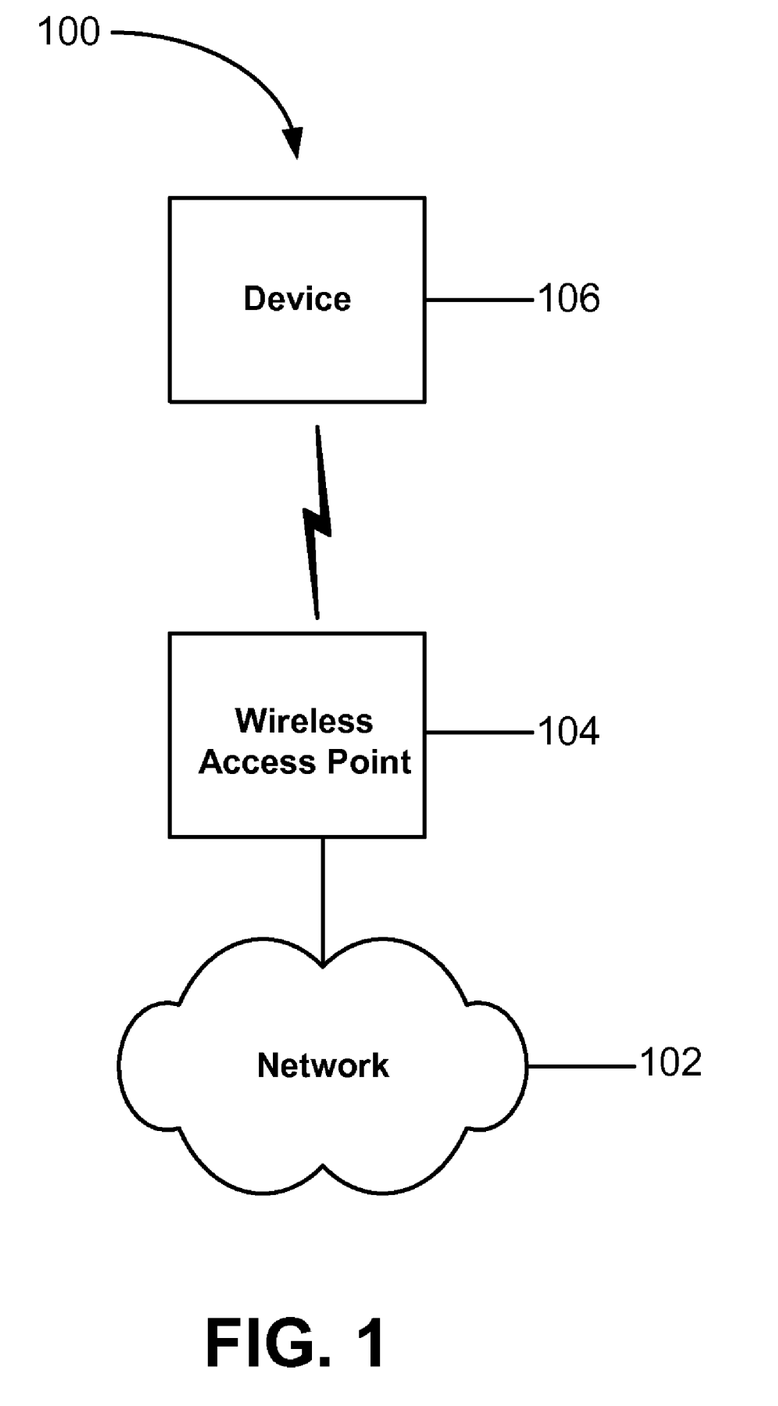
FIG. 1 depicts an exemplary network in which systems and methods described herein may be implemented.

FIG. 1 depicts an exemplary network in which systems and methods described herein may be implemented. Network 100 may include network 102, wireless access point 104, and device 106. In practice, network 100 may include fewer or additional networks, wireless access points, and/or devices.

Network 102 may include one or more packet switched networks, such as the Internet, an intranet, a local area network, a wide area network (WAN), or another type of network, such as Public Switched Telephone Network (PSTN), that is capable of transmitting data from a source device to a destination device. Network 102 may also include one or more wireless networks for receiving wireless signals and forwarding the wireless signals toward the intended destination.

Wireless access point 104 may include a device that operates as a gateway to and from network 102. Examples of wireless access point 104 include a personal computer that is connected to a local area network (LAN) through an Ethernet card or a base station that is connected to the PSTN.

Device 106 may include any of the following devices that have the ability to communicate wirelessly and/or function as a camera and/or an audio recording device or that are adapted to include one or more digital or analog cameras and/or audio recording device: a radio telephone; a personal communications system (PCS) terminal that may combine cellular radiotelephone with data processing, facsimile, and/or data communications capabilities; a mobile telephone; an electronic notepad; a laptop; a personal computer (PC); a personal digital assistant (PDA) that can include a radiotelephone, pager, Internet/intranet access, web browser, organizer, calendar, and/or GPS receiver; wireless computer peripherals (e.g., wireless speakers, wireless microphones, wireless camera); or any device with sufficient computing power and memory to support functions described herein. Device 106 may communicate with other devices in network 102 through wireless access point 104.

Figure 2:
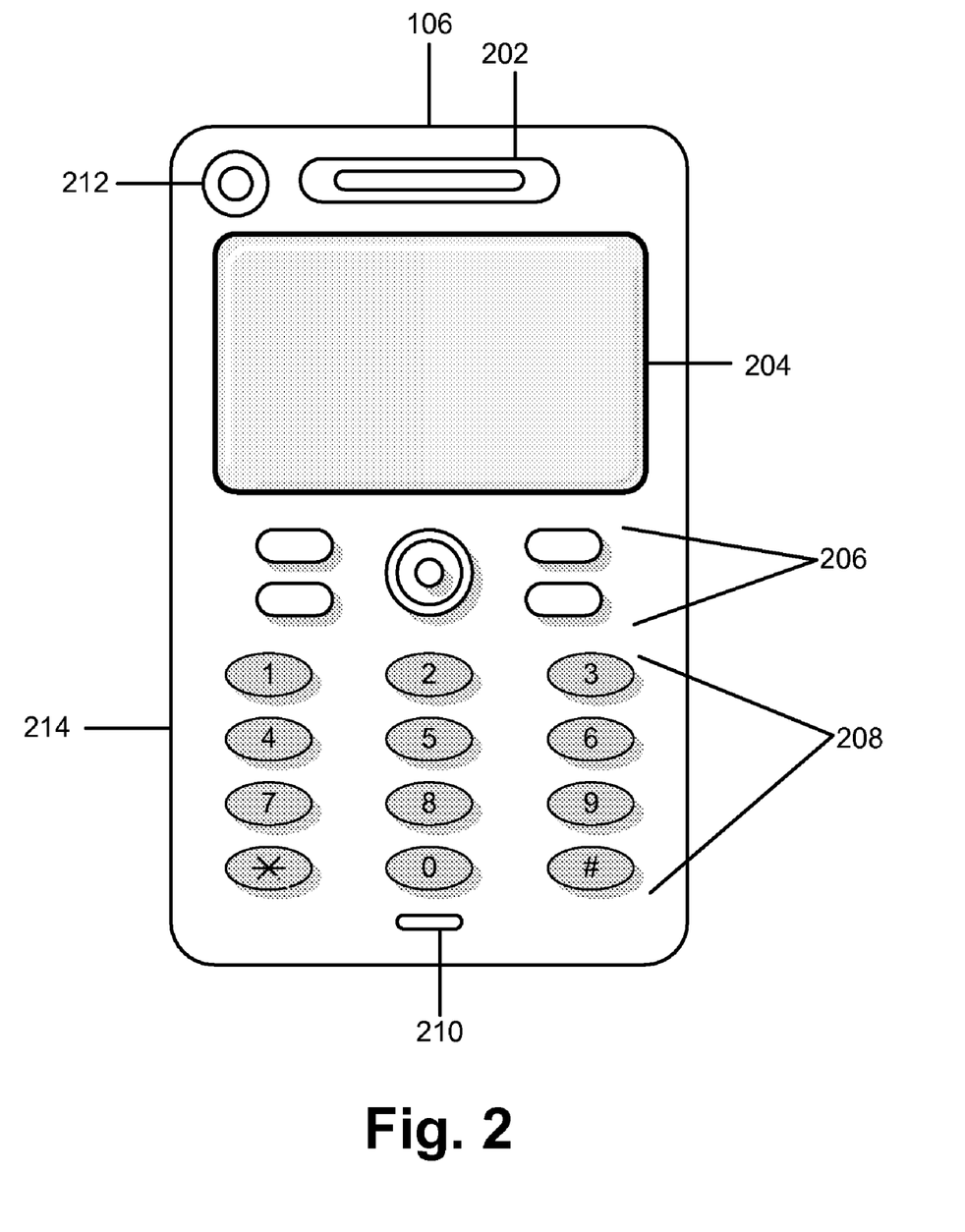
FIG. 2 is an exemplary diagram of the device of FIG. 1.

FIG. 2 is an exemplary diagram of device 106 of FIG. 1. As shown in FIG. 2, device 106 may include a speaker 202, a display 204, control buttons 206, a keypad 208, a microphone 210, a camera 212, and housing 214. Speaker 202 may provide audible information to a user of device 106. Display 204 may provide visual information to the user. For example, display 204 may provide information regarding incoming or outgoing calls, media, games, phone books, the current time, etc. In one implementation, display 204 may provide the user with a graphical user interface for inputting various parameters associated with communication and image preprocessing. Control buttons 206 may permit the user to interact with device 106 to cause device 106 to perform one or more operations. Keypad 208 may include a standard telephone keypad. Microphone 210 may receive audible information from the user. Camera 212 may enable a user to capture and store video and/or images (e.g., pictures). Housing 214 may provide a casing for components of device 106 and may protect the components from outside elements.

Figure 3:
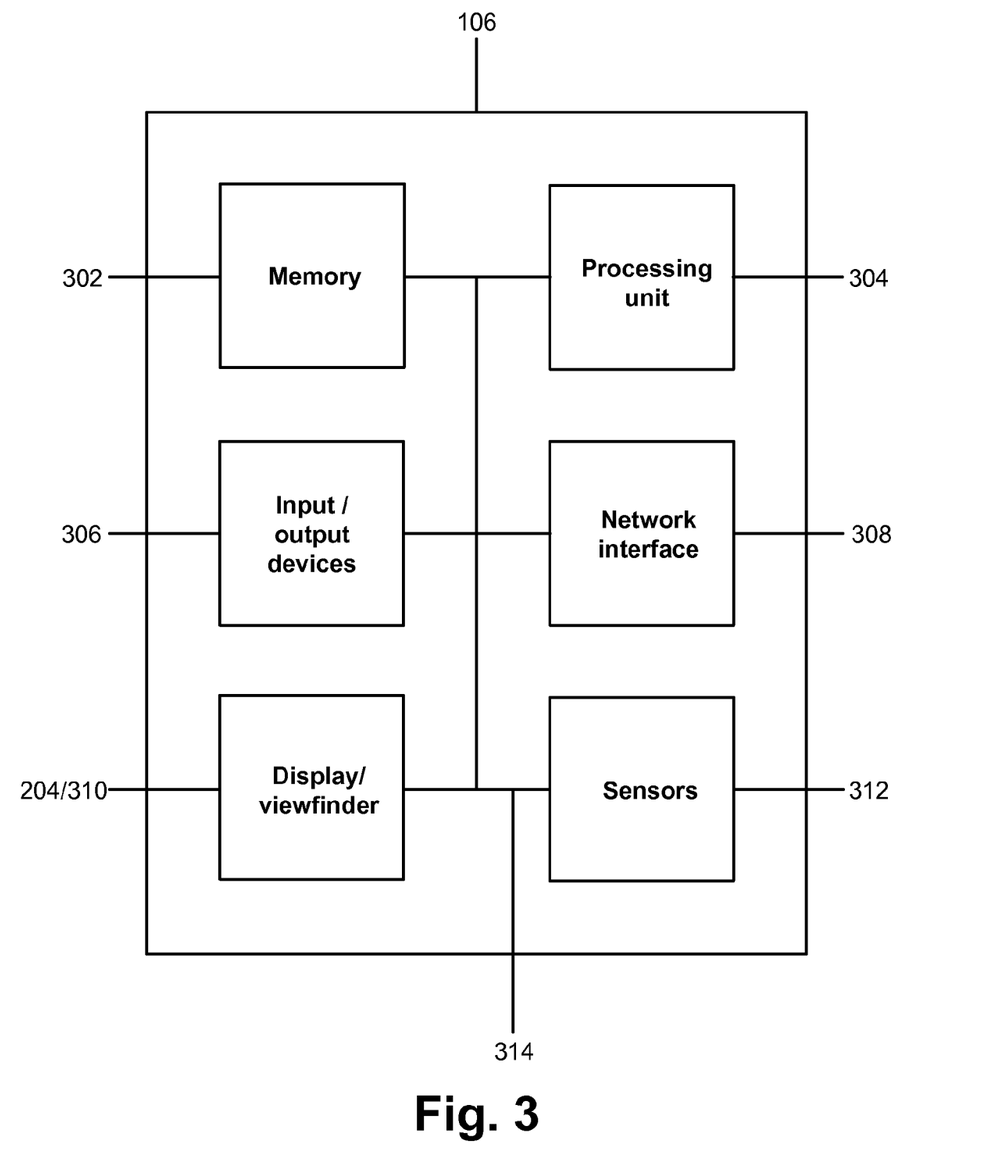
FIG. 3 is an exemplary block diagram of the device of FIG. 2.

FIG. 3 is an exemplary block diagram of device 106 of FIG. 2. Device 106 may include memory 302, processing unit 304, input/output devices 306, network interface 308, display/viewfinder 204/310, sensors 312, and communication bus 314. In another implementation, device 106 may include more, fewer, or different components. For example, when device 106 takes the form of a camera, device 106 may include film.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices.

Processing unit 304 may include one or more processors, microprocessors, and/or processing logic capable of controlling device 106. Input/output devices 306 may include a keyboard, key pad, button, mouse, speaker, microphone, Digital Video Disk (DVD) writer, DVD reader, USB lines, camera, and/or another type of device for converting physical events or phenomena to and/or from digital signals that pertain to device 106. For example, a camera may provide images that can be stored in device 106.

Network interface 308 may include any transceiver-like mechanism that enables device 106 to communicate with other devices and/or systems. For example, network interface 308 may include mechanisms for communicating via a network, such as the Internet, a terrestrial wireless network, a satellite-based network, etc. Additionally or alternatively, network interface 308 may include a modem, an Ethernet interface to a Local Area Network (LAN), Bluetooth radio interface, Wireless Local Area Network (WLAN), Ultra Wide Band (UWB) radio interface, and/or an interface/connection for connecting device 106 to other devices.

Display/viewfinder 204/310 may include a device that can display signals generated by device 106 as images on a screen and/or that can accept inputs in the form of taps or touches on the screen. In addition, display/viewfinder 204/310 may provide a window through which the user may view and/or focus on a subject, and/or replay previously captured material. In one example, display/viewfinder 204/310 may provide information regarding incoming or outgoing calls, media, games, phone books, the current time, etc. Examples of display/viewfinder 204/310 include an optical viewfinder (e.g., a reversed telescope), a liquid crystal display (LCD), cathode ray tube (CRT) display, organic light-emitting diode (OLED) display, surface-conduction electron-emitter display (SED), plasma display, field emission display (FED), bistable display, and/or a touch screen.

Sensors 312 may include one or more devices for obtaining information related to a user and/or images. Sensors 312 may provide the information to processing unit 304, so that processing unit 304 may control input/output devices 306 and process images and other digital data.

Communication bus 314 may provide an interface through which components of device 106 can communicate with one another.

Figure 4:
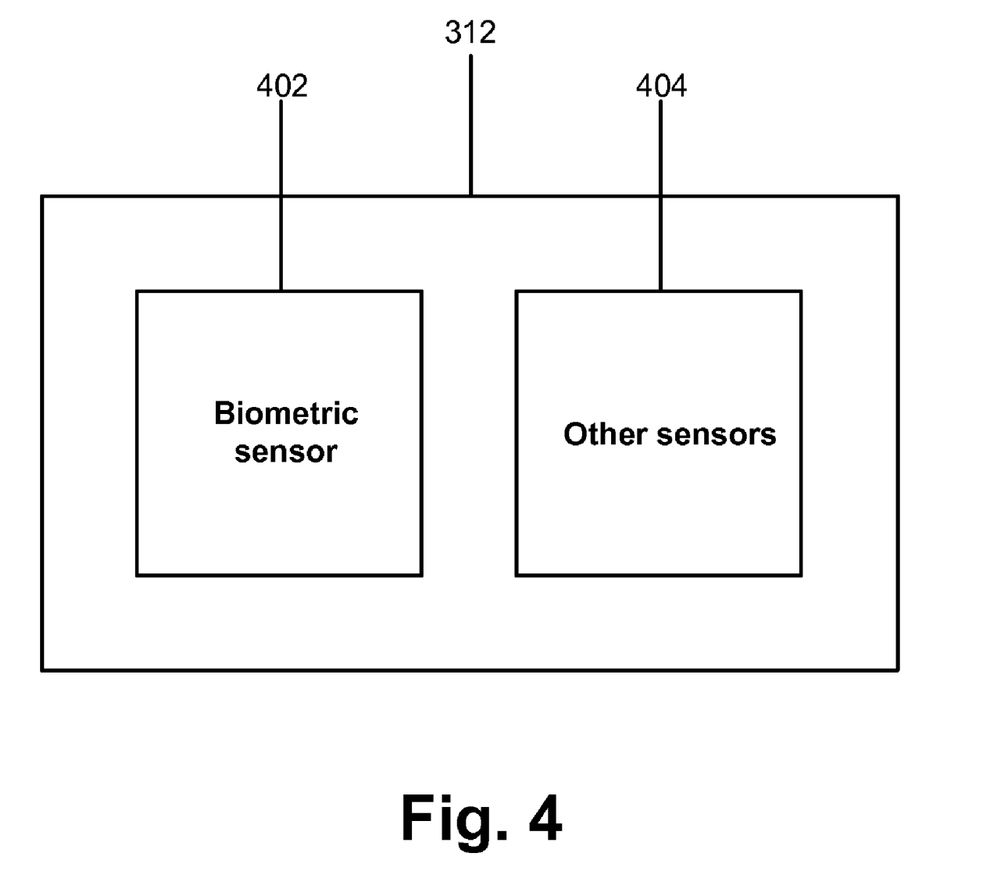
FIG. 4 is an exemplary functional block diagram of the sensors in FIG. 3.

FIG. 4 is an exemplary functional block diagram of sensors 312 in FIG. 3. Sensors 312 may include a biometric sensor 402 and other sensors 404. Biometric sensor 402 may include hardware and/or software for sensing a user's physiological or biometric characteristics, such as fingerprints, voice, or retinal patterns. Information produced by biometric sensor 402 may be used by device 106 for embedding watermarks into digital images. Other sensors 404 may include hardware and/or software for sensing luminance, light, focus, voice, etc., to facilitate capturing images or sounds and for producing information that pertains to the images and sounds. For example, other sensors 404 may include a light sensor (e.g., charge coupled device) for capturing images.

Figure 5:
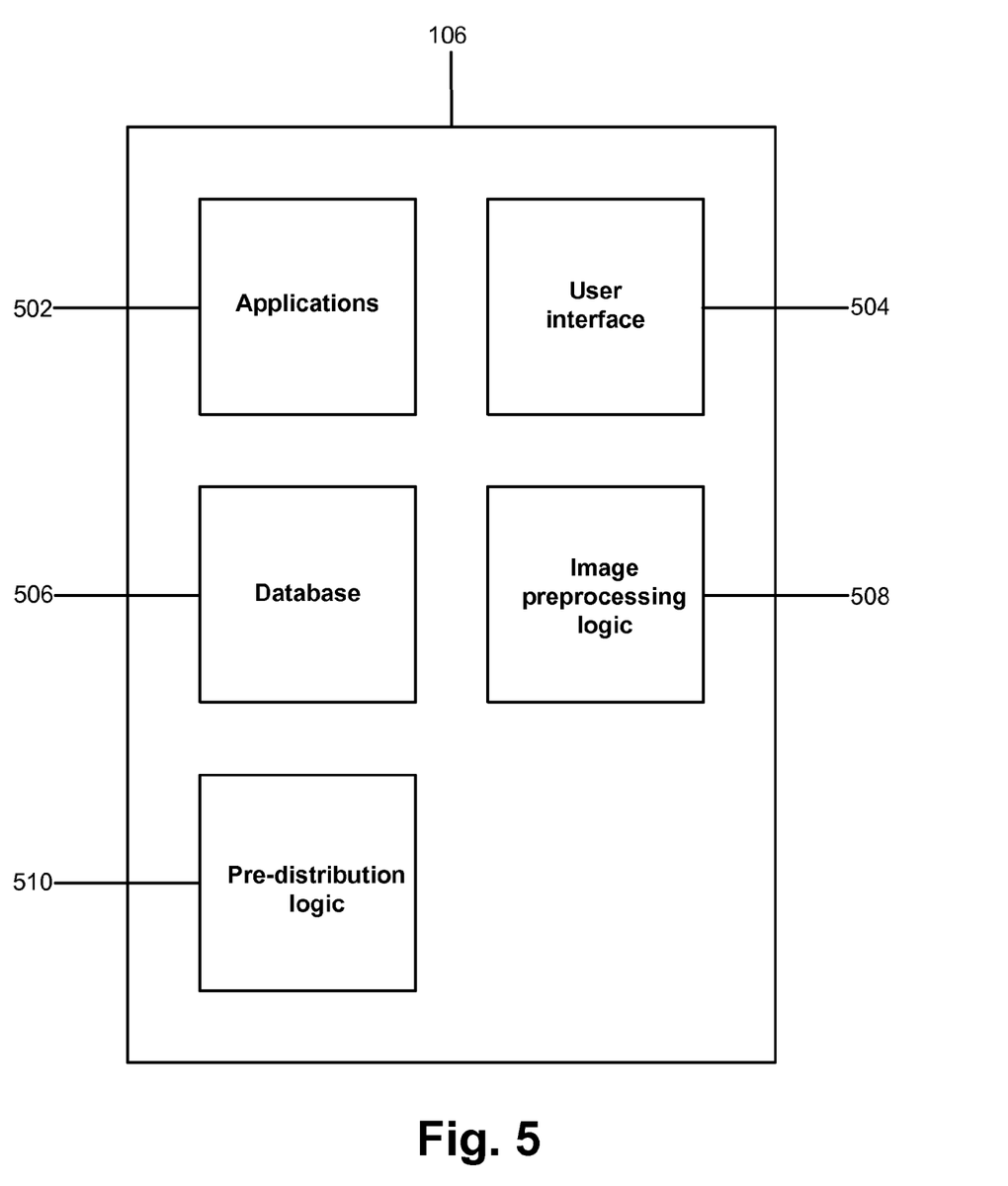
FIG. 5 is an exemplary functional block diagram of exemplary components that are either implemented on or included in the device of FIG. 3.

FIG. 5 is an exemplary functional block diagram of exemplary components that are either implemented on or included in device 106 of FIG. 3. Device may include applications 502, user interface 504, database 506, image preprocessing logic 508, and pre-distribution logic 510. In practice, device 106 may include additional, fewer, or different components than those illustrated in FIG. 5.

Applications 502 may include hardware and/or software for supporting various functionalities of device 106. For example, applications 502 may support text messaging services, email, Multimedia Messaging Services, Bluetooth communications, infrared communications, blogging, file uploading and downloading, image transfer, etc. Further, in providing such support, applications 502 may rely on user interface 504, database 506, image preprocessing logic 508, and/or pre-distribution logic 510. For example, applications 502 may rely on image preprocessing logic 508 when applications 502 transmits (e.g., emails) an image file to other devices in network 102.

User interface 504 may include hardware and/or software for allowing a user to interact with applications 502, database 506, image preprocessing logic 508, and/or pre-distribution logic 510. For example, user interface 504 may allow a user to indicate to pre-distribution logic 510 whether a watermark should be inserted into an image when the image is about to be transmitted to other devices. In another example, user interface 504 may accept, on behalf of image preprocessing logic 508, input parameters for generating watermarks or other types of image preprocessing. In yet another example, user interface 504 may accept inputs that instruct device 106 to display an image that has been captured and/or to remove an image from database 506. If a user does not provide one or more input values, user interface 504 may supply default values, such as a default watermark (e.g., a copyright notice in the form of ©). In addition, user interface 504 may disallow a user from specifying inputs that conflict with each other. For example, user interface 504 may prevent the user from attempting to view an audio file on display/viewfinder 204/310. In one implementation, user interface 504 may allow the user to specify the desired level of copy protection for captured images that are to be distributed.

Returning to describing other elements in FIG. 5, database 506 may include records and files and may act as an information repository for applications 502, user interface 504, image preprocessing logic 508, and/or pre-distribution logic 510. For example, applications 502 and user interface 504 may store and/or retrieve images and sounds to and from database 506. Database 506 may be stored in memory 302 (FIG. 3).

Image preprocessing logic 508 may include hardware and/or software for modifying an image (e.g., color enhancement, image quality reduction, scaling, watermarking).

Pre-distribution logic 510 may recognize when a user is about to transmit or distribute an image and may automatically replace the attached image with a processed version of the image, with or without a user confirmation. In one implementation, the processed version may be a degraded version of the image. The degraded version of the image may be derived by adding noise, removing pixels, modifying colors, and/or filtering. The degraded version may be distributed, without endangering the ownership of the original image, which may be preserved in database 506 for later use.

In an alternative implementation, pre-distribution logic 510 may keep two versions of each image, one which is preprocessed watermark and one that is not preprocessed. The image file that the user normally sees when attaching an image to an email message, text message, or any other mode of distribution may be the preprocessed copy. The copy of the image that has not been preprocessed may be accessed through a special application and may be normally hidden.

In another implementation, pre-distribution logic 510 may automatically select an appropriate watermark and automatically inserts it, depending on the desired level of copyright protection that is selected by a user.

Figure 6:
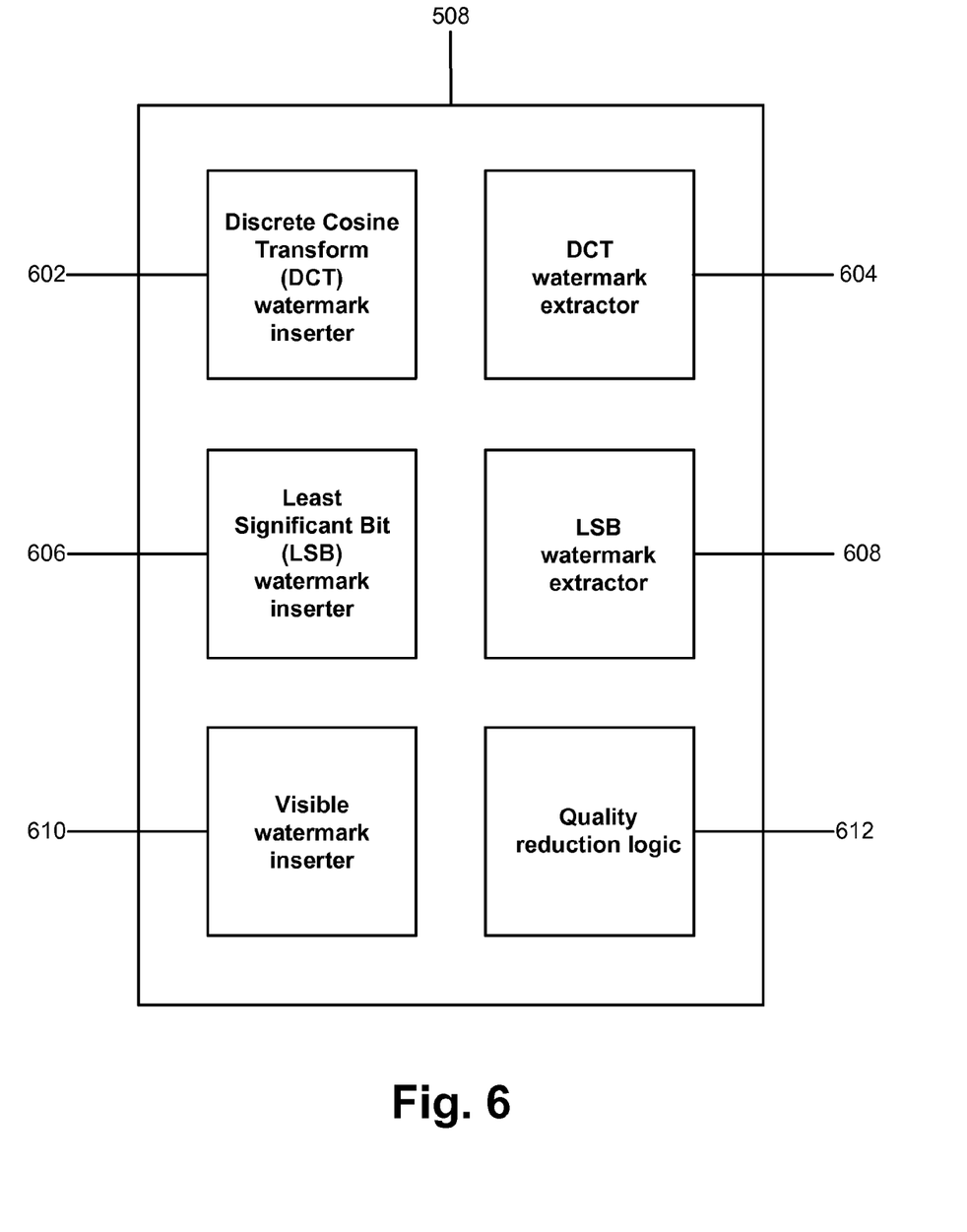
FIG. 6 is an exemplary functional block diagram of the image preprocessing logic of FIG. 5.

FIG. 6 is an exemplary functional block diagram of image preprocessing logic 508 of FIG. 5. As illustrated, image preprocessing logic 508 may include Digital Cosine Transform (DCT) watermark inserter 602, DCT watermark extractor 604, Least Significant Bit (LSB) watermark inserter 606, LSB watermark extractor 608, and visible watermark inserter 610, and/or quality reduction logic 612. In practice, image preprocessing logic 508 may include other components for applying different types of image effects, such as changing color temperature, white balancing, dithering, filtering, and adding Discrete Wavelet Transform (DWT) watermarks. Further, image preprocessing logic 508 may omit components such as DCT watermark extractor 604 and/or LSB watermark extractor 608.

DCT watermark inserter 602 may include hardware and/or software for watermarking an image by decomposing the image into frequency components and enhancing selected frequencies in accordance with information specific to a user and/or to device 106. In DCT watermarking, because frequencies encode a message, the embedded watermark may be invisible and may remain intact despite image tampering, such as cropping. If too much information is encoded through DCT watermarking, the quality of the image may be reduced.

DCT watermark extractor 604 may include hardware and/or software for accepting an image and detecting DCT watermarks that have been embedded in the image by DCT watermark inserter 602. Accordingly, DCT watermark extractor 604 may identify images that have been watermarked at device 106.

LSB watermark inserter 606 may include hardware and/or software for watermarking an image by overwriting the least significant bit of each pixel in the image. Because LSB watermarking, in effect, replaces one color with another, similar color, the LSB watermark may be invisible.

LSB watermark extractor 608 may include hardware and/or software for accepting an image and detecting embedded LSB watermarks in the image. If LSB watermark inserter 606 and LSB watermark extractor 608 use complementary encoders and decoders to embed and extract a watermark, LSB watermark extractor 608 can identify images that have been watermarked at device 106, provided that the images have not been significantly altered.

Visible watermark inserter 610 may include hardware and/or software for watermarking an image by altering a portion of the image (e.g., darkening colors). For example, visible watermarking inserter 610 may place a copyright notice on the image.

Quality reduction logic 612 may reduce the quality of an image by decimation or by adding noise. Quality reduction logic 612 may be viewed as a type of watermarking inserter, where the watermark includes noise.

Exemplary Process for Preprocessing

Figure 7:
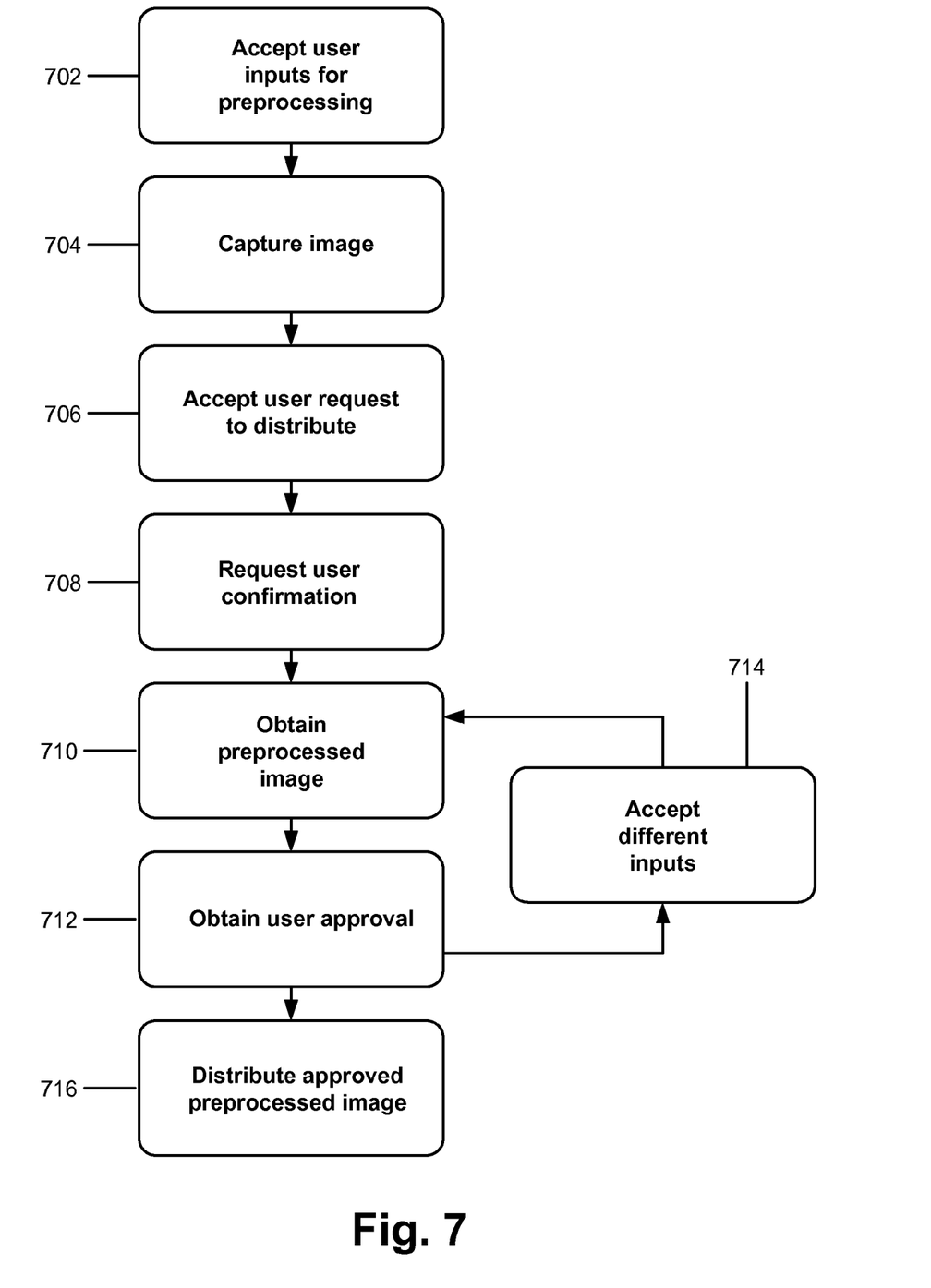
FIG. 7 shows an exemplary process for preprocessing images before distributing the images.

FIG. 7 shows an exemplary process for preprocessing images before distributing the images. At block 702, user inputs for preprocessing images are accepted and/or stored in database 506 through user interface 504.

Figure 8:
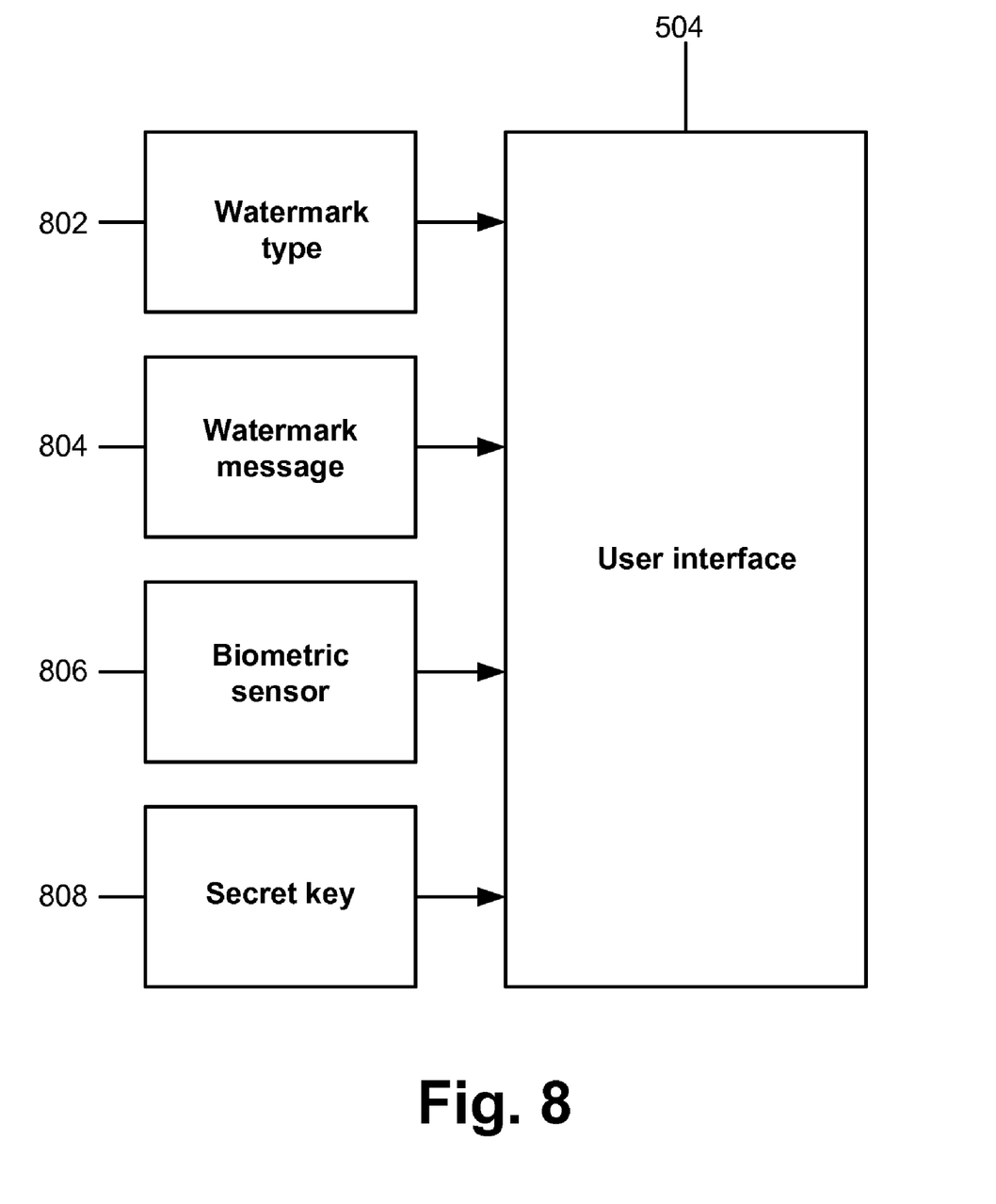
FIG. 8 illustrates different user inputs that may be accepted at the user interface of FIG. 5 for watermarking.

FIG. 8 illustrates different user inputs that may be accepted at user interface 504, perhaps at different times, for a watermark related preprocessing. The inputs may include a watermarking type 802; a watermark message 804; a biometric sensor 806; and/or a secret key 808. Watermark type 802 may specify what type of watermark inserter may be used. For example, watermark type 802 may indicate that a user wishes to employ DCT watermark inserter 602 among the different types illustrated in FIG. 6. It may also be possible for the user to not select a watermark type. In such a scenario, no watermark may be inserted in an image before it is transmitted to other devices.

Watermark message 804 may specify the message that the user wish to embed, as part of a watermark, in an image. For example, if the user inputs "Martin and Mikael," the watermark that is embedded in an image may contain the message "Martin and Mikael." Biometric sensor 806 may specify which available biometric sensor outputs may be incorporated into a watermark. For example, a user may select a retinal scanner (not shown). Secret key 808 may contain information which is used in encoding data that is to be embedded as a watermark. In addition, secret key 808 may be used to recover the original watermark from a watermarked image, provided that the watermark has been produced at or distributed from device 106 by the same user.

Returning to FIG. 7, at block 704, an image may be captured. The captured image may include a photograph, a video clip, or any other types of visual image. In one implementation, the image may be captured in a file. In another implementation, the image may be captured in two different versions, one that has been preprocessed and one that has not been preprocessed.

Figure 9:
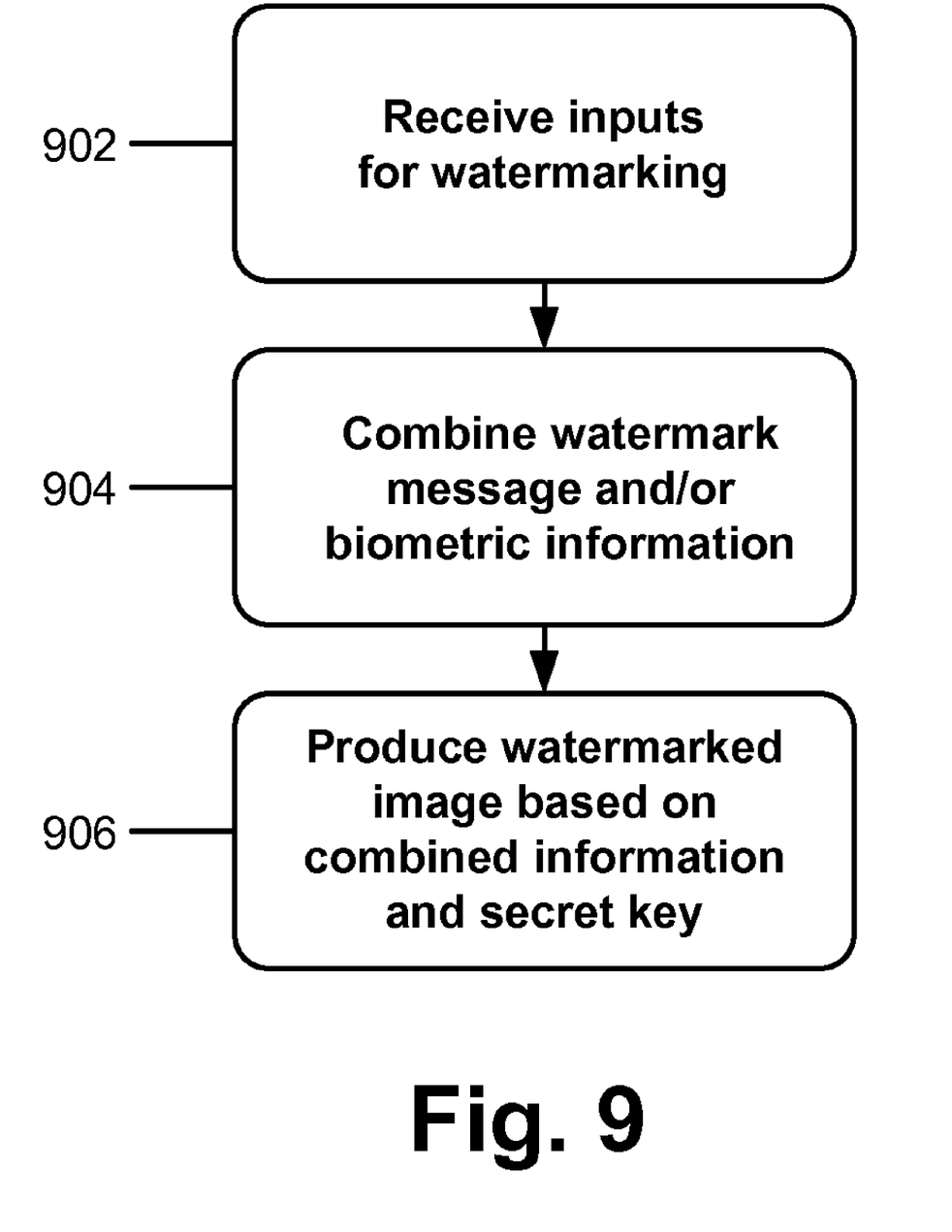
FIG. 9 illustrates an exemplary process for obtaining a watermarked image.
Figure 10:
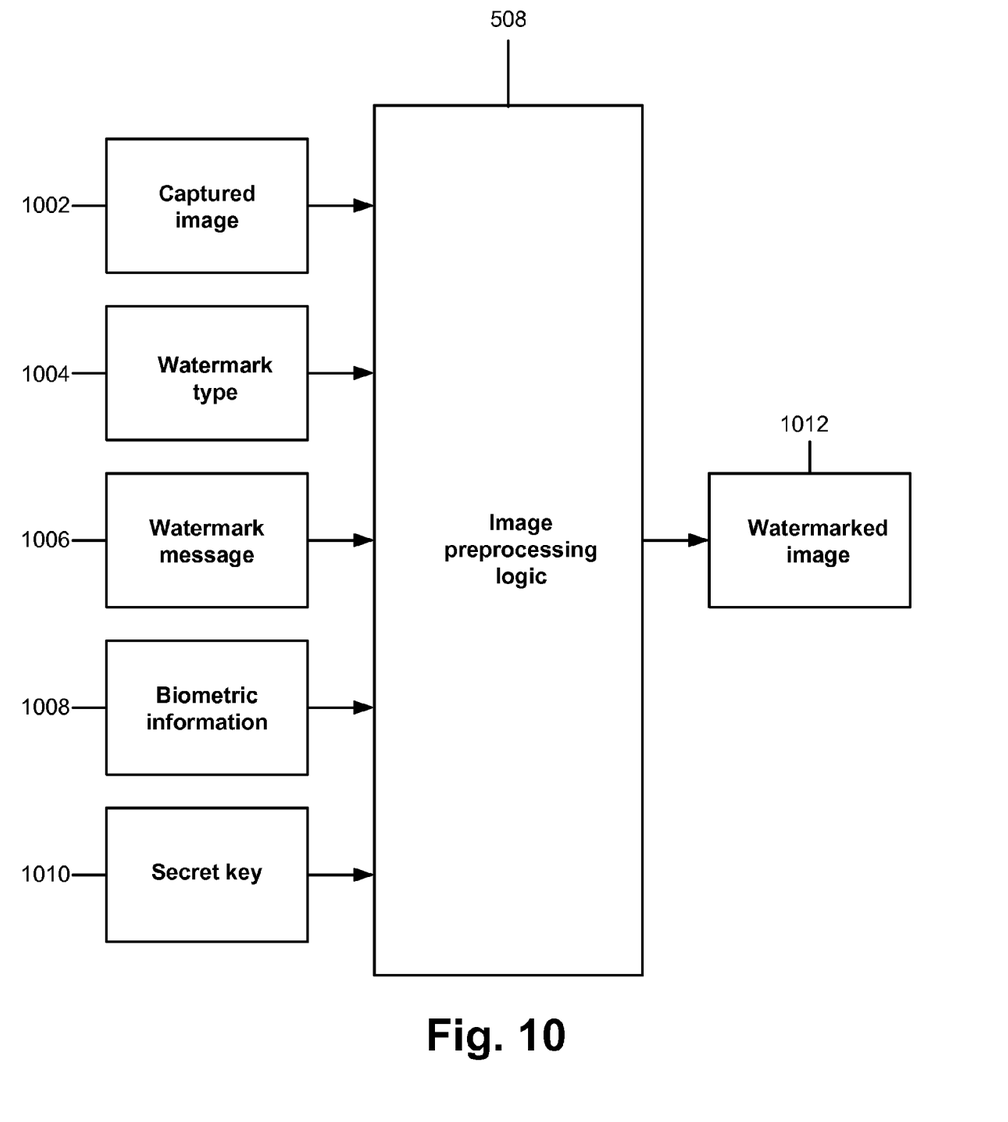
FIG. 10 shows exemplary inputs to the preprocessing logic of FIG. 5 to produce a watermarked image.

FIG. 9 illustrates an exemplary process for capturing image with preprocessing. More specifically, FIG. 9 illustrates an exemplary process for obtaining a watermarked image. At block 902, various inputs may be received at image preprocessing logic 508. As shown in FIG. 10, image preprocessing logic 508 may receive a captured image 1002, watermark type 1004, watermark message 1006, biometric information 1008, and/or secret key 1010. Captured image 1002 may be a picture or an image produced, for example, by camera 212. Alternatively, captured image 1002 may be received by device 106 from another device. Watermark type 1004, watermark message 1006, and secret 1010 may include the same information that are conveyed to user interface 504 by watermark type 802, watermark message 804, and secret key 808. Biometric information 1008 may include the output of the biometric sensor (e.g., retinal scanner) that is selected based on biometric sensor 806.

At block 904, watermark message 1006 and biometric information 1008 may be combined. At block 906, the combination may be used at a watermark inserter (e.g., DCT watermark inserter 602, LSB watermark inserter 606, or visible watermark inserter 610), together with captured image 1002 and secret key 1010 to produce watermarked image 1012. The effect of applying secret key 1010 to the combination (i.e., watermark message 1006 and biometric information 1008) is to encode the combination into the captured image, so that applying DCT watermark extractor 604 or LSB extractor 608 to watermarked image 1012 may not necessarily reveal that the image is watermarked or the content of the watermark.

In different implementations, a watermarked image may not involve secret key 1010 or biometric information 1008, and watermarking may be as simple as adding a copyright symbol, such as ©, and the user name to the captured image. Such watermarks may be used when the desired level of copyright protection is low, or when a preview of an image is distributed to a potential buyer before the price of the image is negotiated. Invisible watermarks may still be added to distributed pictures in case the pictures are used outside of the agreed upon terms.

In one implementation, insertion of watermark may be performed automatically, depending on the level of copyright protection that is automatically determined by device 106. For example, if device 106 determines that an image may be distributed to a large number of people (e.g., blogging), watermarks with a high level of security may be inserted into the image prior to its distribution. In another instance, if the user of device 106 chooses to distribute the image to people identified as friends/family in an address book that is stored in device 106, device 106 may automatically determine that a low level of copyright protection may be needed. In this manner, device 106 may automatically determine the level of copyright protection based on pre-set parameters. These parameters may be initially set and later reset by the user via user interface 504. Device 106 may then automatically provide the desired level of protection.

Returning to FIG. 7, at block 706, a user request to distribute the captured image may be accepted. The request may be made through one of applications 502, such as an email application, a file transfer application, a web posting application, and/or other application that involves information exchanges with other devices in network 102.

At block 708, a user confirmation to preprocess the captured image may be requested. In the implementation in which the preprocessed image is captured at block 704, the confirmation may be requested prior to preprocessing, so that the preprocessed images can be generated along with the original image.

At block 710, a preprocessed image may be obtained. In implementations that create a watermarked image when the image is captured, the watermarked version is retrieved. If a watermarked image does not exist at the start of block 710, the watermarked may be generated in accordance with a process consistent with FIG. 9, as described above.

At block 712, a user approval of the preprocessed image may be obtained. A preprocessed image that has been generated may be displayed to the user via display 204, and the user may approve the displayed image. If the preprocessed image does not provide the desired level of image quality and the user approval is not obtained, different inputs for preprocessing may be accepted (block 714). Blocks 710, 712 and 714 may be repeated until the preprocessed image is approved.

Once a user approval has been obtained, at block 716, the approved preprocessed image may be distributed, through one of applications 502.

While blocks 702-716 have been described with reference to watermarking, the blocks also apply to other types of preprocessing, such as reducing image quality.

Exemplary Process for Detecting a Watermark

Whenever a watermarked original is copied, legally or illegally, the copied image may also bear the watermark.

Thus, detecting a specific watermark in an image can demonstrate that the image is a copy of the original.

Figure 11:
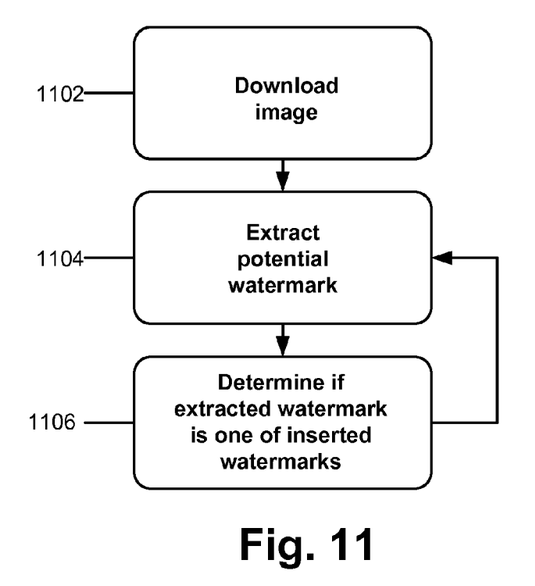
FIG. 11 shows an exemplary process for detecting a watermark in an image.

FIG. 11 illustrates an exemplary processing for detecting a watermark in an image. At block 1102, an image for which a watermark is to be detected is downloaded to a device that includes a watermark detector. In one implementation, the image may be downloaded to device 106, which may include DCT watermark extractor 604 and LSB watermark extractor 608.

At block 1104, a potential watermark may be extracted from the image. To extract the potential watermark, one of the watermark extractors (i.e., DCT watermark extractor 604 and LSB watermark extractor 608) in device 106 may be applied to the image. An application of a watermark extractor may involve decoding information that may have been added to the image, by using a secret key, such as secret key 1010 described above. The extracted watermark may be compared to biometric information and watermark messages that are stored in database 506. If a match is found, the process in FIG. 11 may terminate. Otherwise, the process may return to block 1104, with another secret key and/or another watermark extractor. The process may continue until a match is found, or all watermark extractors and keys have been compared, to attempt to identify a match.

By detecting a watermark that may have been added to the image at image preprocessing logic 508, a watermark extractor may show that the image has been originally created or modified at device 106.

As with many watermark extraction techniques, it is possible that DCT watermark extractor 604 and/or LSB watermark extractor 608 may not be able to recover the original watermark from an image, even though the watermark may have been added to the image by either DCT watermark inserter 602 and/or LSB watermark inserter 606. The image may have been filtered, modified, and degraded such that the watermark may no longer be recognizable by the watermark extractors. It is also possible that the watermark may have been intentionally removed by another party with sufficiently sophisticated techniques.

Alternative Implementations

Figure 12:
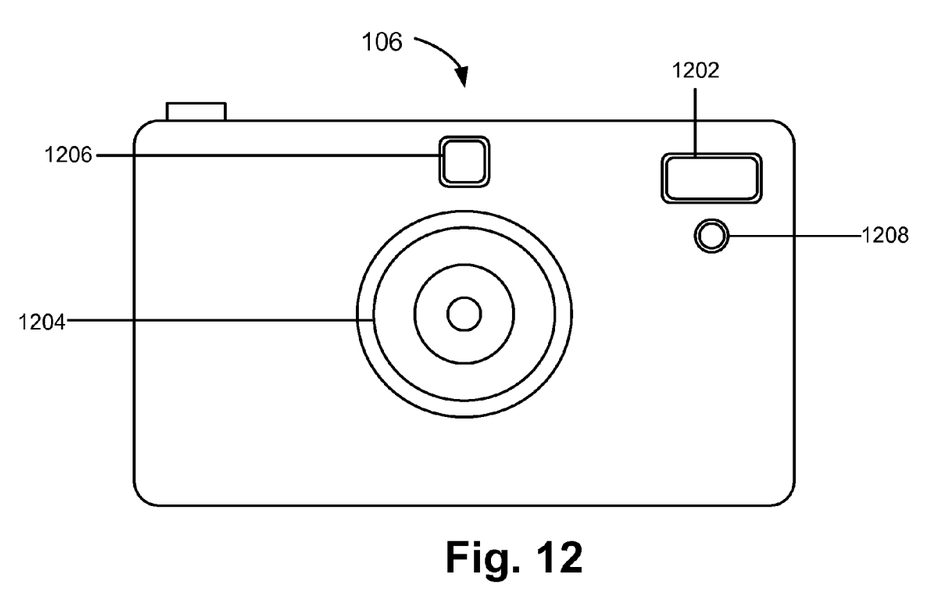
FIG. 12 shows another exemplary diagram of the device of FIG. 1.

FIG. 12 shows another exemplary diagram of device 106 of FIG. 1. As shown in FIG. 12, device 106 may include a viewfinder 1202, a lens assembly 1204, a flash 1206, and sensors 1208. While not shown in FIG. 12, device 106 may also include components that have been described with references to FIGS. 2-6.

Viewfinder 1202 may provide visual information to the user and may include a display (e.g., a cathode ray tube (CRT), liquid crystal display (LCD), or an organic light-emitting diode (OLED) based display) that a user of device 106 may look through to view and/or focus on a subject and/or to view/replay previously captured material.

Lens assembly 1204 may include a device for manipulating light rays from a given or a selected range, so that images in the range can be captured in a desired manner. Lens assembly 1204 may be controlled manually and/or electromechanically by its processing unit to obtain the correct focus on a subject and a desired magnification of the subject image and to provide a proper exposure.

Flash 1206 may include any type of flash unit used in cameras. For example, flash unit 1206 may include a flash unit built into device 106; a flash unit separate from device 106; an electronic xenon flash lamp (e.g., a tube filled with xenon gas, where electricity of high voltage is discharged to generate an electrical arc that emits a short flash of light); or a microflash (e.g., a special, high-voltage flash unit designed to discharge a flash of light with a sub-microsecond duration).

Sensors 1208 may include one or more devices for obtaining information related to image, luminance, and focus. In addition to the functions provided by sensors 312 to device 106, sensors 1208 may provide information to its processing unit 304, so that processing unit 304 may control lens assembly 1204 and flash 1206. In another implementation, sensors 1208 may be coupled to viewfinder 1202 to provide biometric information.

While not shown in FIG. 12, device 106 may include a network interface, which may be similar to network interface 308 and may operate similarly. Captured images, ones with a watermark and without a watermark, may be transmitted and/or received through the network interface.

EXAMPLE

Figure 13A:
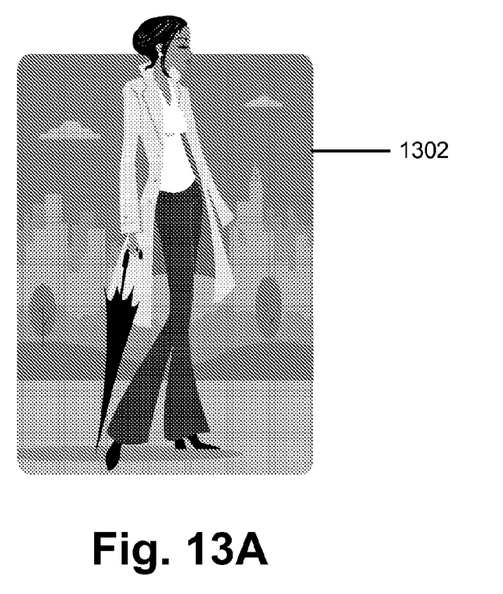
FIGS. 13A, 13B, and 13C show an image without a watermark, a watermark, and a watermarked image, respectively.
Figure 13B:
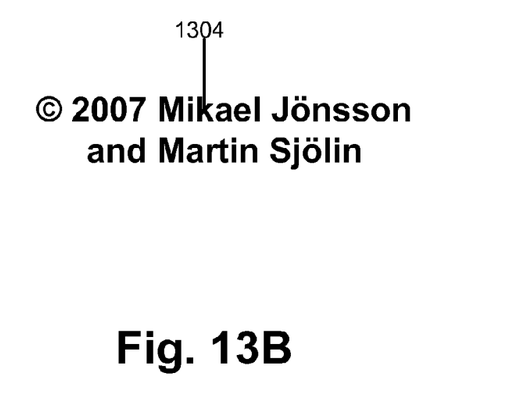
Figure 13C:
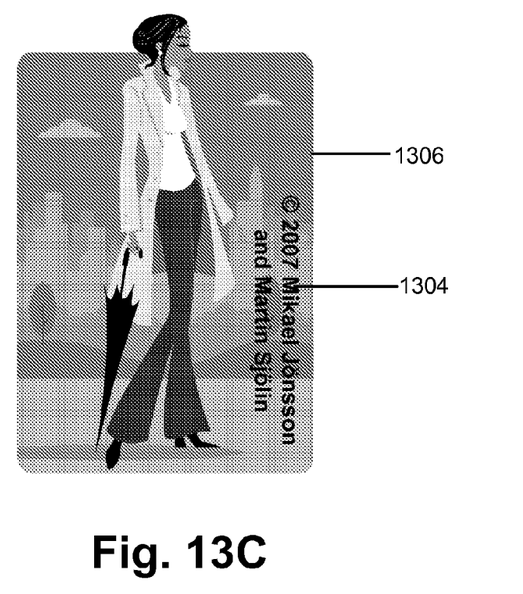

The following example illustrates processes involved in preprocessing an image, with references to FIG. 13A-13C, which show an image without a watermark, a watermark, and a watermarked image, respectively. The example is consistent with the exemplary processes described above with references to FIGS. 7 and 9.

Assume that Martin decides to send Mikael a photograph he takes on his device 106. Also assume that Martin sets device 106 to use visible watermark inserter 610 and to embed the watermark message "© 2007 Mikael Jönsson and Martin Sjölin" into any picture Martin sends from device 106. In addition, assume that the device is not set to use a biometric sensor and a secret key.

Martin captures an image 1302, as illustrated in FIG. 13A. Device 106 accepts Martin's request to send image 1302 as an email attachment to Mikael and requests Martin to confirm whether a watermark is to be inserted. When Martin confirms, image preprocessing logic 508 within device 106 uses image 1302 and watermark message 1304 (illustrated in FIG. 13B) to produce watermarked image 1306, as illustrated in FIG. 13C. Watermarked image 1306 contains the copyright notice, "© 2007 Mikael Jönsson and Martin Sjölin."

Device 106 requests Martin to approve that watermarked image 1306 is satisfactory. Upon receiving Martin's approval, the watermarked image is transmitted as an email attachment to Mikael.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while device 106 has been described for watermarking images, device 106 may be modified to include components for preprocessing sounds and/or other multimedia data. The preprocessed sounds or other multimedia data may be watermarked and included, perhaps as records files (e.g., image files, music files, data files, etc) that may be transmitted by device 106.

In addition, while series of blocks have been described with regard to processes illustrated in FIGS. 7, 9, and 11, the order of the blocks may be modified in other implementations. For example, blocks 708 and/or 710 may be performed just after 704 and block 708 and/or 712 may be omitted. In addition, non-dependent blocks, such as block 702, may represent acts that can be performed in parallel with a number of other blocks.

In addition, while device 106 has been described as capturing images, in other implementations, device 106 may receive captured images from other devices or via a computer readable storage device (e.g., memory card, compact disk, etc.) and may be used to perform watermark related processing on the received images.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, a microprocessor, an application specific integrated circuit, or a field programmable gate array, software, or a combination of hardware and software.

What is claimed is:

1. A method comprising:
   accessing an image in a portable device;
   receiving a first copy protection parameter for the image;
   receiving a second copy protection parameter for the image;
   in response to determining the second copy protection parameter conflicts with the first copy protection parameter, rejecting the second copy protection parameter;
   determining that the image is about to be transmitted from the portable device to another device;
   in response to determining that the image is about to be transmitted:
      determining whether a watermarked version of the image is stored in the portable device;
      in response to determining a watermarked version of the image is not stored in the portable device, automatically selecting a type of watermark to be embedded in the image based on the first copy protection parameter;
      embedding the selected type of watermark into the image in the portable device; and
      transmitting the watermarked image through an interface of the portable device.

2. The method as in claim 1, where accessing an image in a portable device includes:
   capturing the image in a portable device by using a camera in the portable device.

3. The method as in claim 1, where embedding a watermark into the image includes:
   embedding a visible or invisible watermark.

4. The method as in claim 1, where embedding a watermark into the image includes:
   embedding copy protection information as a Discrete Cosine Transform (DCT) watermark.

5. The method as in claim 1, further comprising:
   downloading an image to the portable device;
   extracting a watermark from the downloaded image; and
   determining if the extracted watermark is a watermark that has been embedded in the image by the portable device.

6. A method comprising:
   accessing an unwatermarked version of an image in a portable device;
   determining that the unwatermarked version of the image is about to be distributed;
   in response to determining that the unwatermarked version of the image is about to be distributed:
      determining whether a watermarked version of the image is stored in the portable device;
      in response to determining a watermarked version of the image is stored in the portable device, replacing the unwatermarked version of the image with the watermarked version of the image, the quality of the watermarked version of the image being automatically modified based on a desired level of copy protection for the image, where an amount of image modification is based on the desired level of copy protection for the image; and
      distributing the watermarked version of the image through an interface of the portable device.

7. A device comprising:
   an interface; and
   a processor to:
      access an image in the device;
      receive a first copy protection parameter for the image;
      receive a second copy protection parameter for the image;
      in response to determining the second copy protection parameter conflicts with the first copy protection parameter, reject the second copy protection parameter;
      determine that the image is about to be transmitted;
      in response to determining that the image is about to be transmitted:
         determine whether a watermarked version of the image is stored in the portable device;
         in response to determining a watermarked version of the image is not stored in the portable device, automatically select a type of watermark to be embedded in the image based on the first copy protection parameter; and
         automatically embed the selected type of watermark into the image; and
      initiate transmission of the image with the watermark through the interface to another device.

8. The device as in claim 7, where the device comprises a portable phone and a camera that can be used to capture the image.

9. The device as in claim 7, where the watermark includes:
   a copyright watermark.

10. The device as in claim 7, where the watermark includes:
    information that identifies the device.

11. The device as in claim 7, where the watermark includes:
    a watermark that encodes a message based on a secret key.

12. The device as in claim 7, where the watermark includes:
    a watermark that authenticates the image.

13. The device as in claim 7, where the watermark includes: a watermark that, when embedded into an image, may be recovered from the image after the image is modified.

14. The device as in claim 7, further comprising:
a biometric sensor for providing biometric information to be included in the watermark, wherein the biometric information identifies an author of the image.

15. A portable device comprising:
an interface; and
a processor to:
  access a first unwatermarked version of an image in the portable device;
  determine that the first unwatermarked version of the image is about to be sent;
  in response to determining that the first unwatermarked version of the image is about to be sent:
    replace the first unwatermarked version of the image with a second unwatermarked version of the image
    automatically reduce a quality of the second unwatermarked version of the image based on a desired level of copy protection for the image, where an amount of image quality reduction is based on the desired level of copy protection for the image; and
    initiate sending of the image with the reduced quality to another device by using the interface.

16. A wireless device comprising:
means for accessing an image in the wireless device;
means for receiving a first copy protection parameter for the image;
means for receiving a second copy protection parameter for the image;
in response to determining the second copy protection parameter conflicts with the first copy protection parameter, means for rejecting the second copy protection parameter;
means for determining that the image is about to be transferred;
in response to determining that the image is about to be transferred:
  means for determining whether a watermarked version of the image is stored in the portable device;
  in response to determining a watermarked version of the image is not stored in the portable device, means for automatically selecting a type of watermark to be embedded in the image based on the first copy protection parameter;
  means for embedding the selected watermark into the image; and
  means for transferring the image with the watermark to another wireless device.

17. The method as in claim 1, wherein the automatically selecting a type of watermark further comprises:
automatically selecting a type of watermark to be embedded in the image based on information associated with a distribution of the image,
wherein the information comprises a list of designated recipients of the distribution of the image, wherein at least one of: in response to determining the list of designated recipients comprises one or more recipients unacquainted with a user, the watermark embedded in the image is configured to provide a high level of security, or in response to determining the list of designated recipients comprises one or more recipients acquainted with the user, the watermark embedded in the image is configured to provide a low level of security.

18. The method as in claim 1,
wherein the accessing comprises accessing a first version of the image, wherein the first version of the image is the unwatermarked version of the image;
wherein the determining comprises determining the first version of the image is about to be transmitted,
wherein in response to determining the first version of the image is about to be transmitted, replacing the first version of the image with a second unwatermarked version of the image;
wherein the embedding further comprises embedding the selected type of watermark into the second version of the image, and
wherein the transmitting further comprises transmitting the second version of the image.

19. The method as in claim 1, wherein the selected type of watermark is a copyright watermark.

20. The method as in claim 1, further comprising:
displaying the watermarked image on a display associated with the portable device; and
requesting approval of the watermarked image.

* * * * *